Nov. 19, 1940. G. WÜNSCH 2,222,458
GYRO-MAGNETIC COMPASS
Filed July 11, 1933
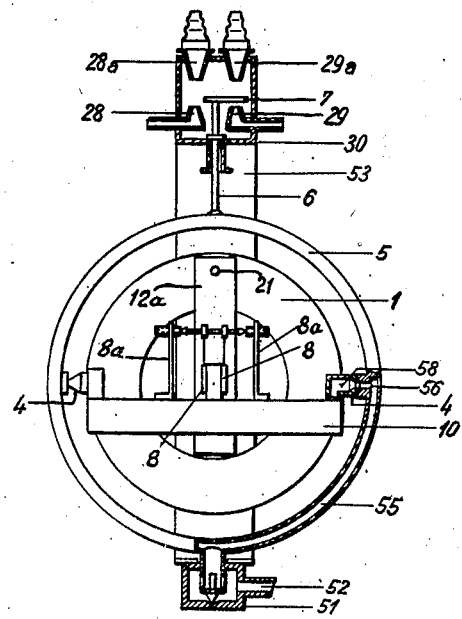
Fig. 1
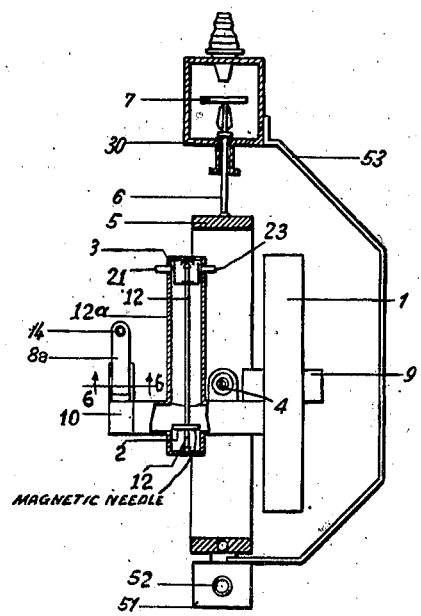
Fig. 2
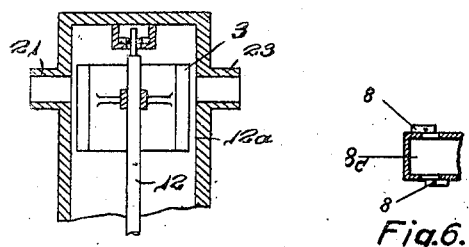
Fig. 4
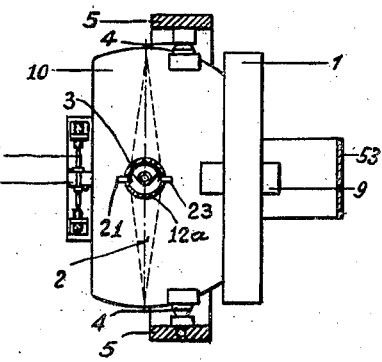
Fig. 3
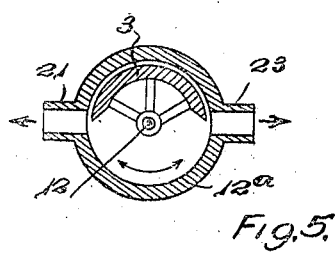
Fig. 5
Fig. 6.
Inventor: Guido Wünsch
by Edward H. Palmer
Atty.

Patented Nov. 19, 1940

2,222,458

UNITED STATES PATENT OFFICE 2,222,458

GYRO-MAGNETIC COMPASS

Guido Wünsch, Berlin-Steglitz, Germany, assignor to Askania-Werke A. G., a corporation of Germany Application July 11, 1933, Serial No. 679,902
In Germany July 15, 1932

16 Claims. (Cl. 33—222)

This invention relates to magnetic compasses.

The invention and its aims and objects will be readily understood from the following description, taken in connection with the accompanying drawing, of one illustrative embodiment of the invention, the true scope of the invention being more particularly pointed out in the appended claims.

In the drawing:

Fig. 1 is a diagrammatic representation of one illustrative embodiment of the invention in front view.

Fig. 2 is a diagrammatic representation of said embodiment seen from the side.

Fig. 3 is a diagrammatic representation of said embodiment in top view.

Figs. 4 and 5 illustrate in detail the valve 3.

Fig. 6 is a fragmentary sectional view taken on the line 6—6 of Fig. 2.

In the use of magnetic compasses on air craft the position of equilibrium of the universally suspended magnet system very often shows very marked deflections or deviations from the horizontal plane, that is to say, from the surface level of the earth attraction or gravity, in the case of lateral accelerations, i. e. when the air craft describes a curve. Such deviation may be sufficiently large to entail an error of 2½° in the compass reading.

To this objectionable feature caused largely by the domination of the gravity field by the acceleration fields, there must be added mass accelerations resulting from the imperfect equilibrium of the needle system, the injurious influences of the movements of the air craft body about the magnet system upon the earth magnetic field, as also the carrying along of the magnet system by rotation of the compass housing, and similar injurious influences. All these injurious influences, owing to the greater speed and therefore greater accelerations in the case of air craft have become much greater disturbing factors than was heretofore the case in water navigation.

Attempts have been made to overcome these objectionable features by the use of various expedients well known to the art, but so far as applicant is aware without success.

The above recited difficulties and disadvantages are overcome by the present invention, which also uses the deviations of the magnetically sensitive direction indicating part or element from the relative correct position to exert or cause to act upon the gyroscope a force which, by reason of the precession caused thereby tends to restore the gyroscope to its relatively correct position with respect to the magnetic system. In accordance with the present invention however, said forces or torques are exerted by or derived from absolute reaction forces in respect to space, for example by forces exerted by compressed air or other compressed fluid jets, which are thrown in or rendered operative by the relative movements of the magnetically sensitive direction indicating part or element and the gyroscope. In accordance with the present invention therefore, the forces which coerce the gyroscope do not, as in apparatus heretofore used, have a point of application upon the apparatus itself, but on the contrary they exert a reactive force thereon the gyroscope relative to absolute space. The errors therefore, heretofore due to the fact that such forces have their points of application upon the housing as well as upon the gyroscope, as above pointed out, are eliminated by the present invention.

Another object of the invention relates to the suspension of the entire compass and gyroscope system for rotation about a horizontal axis extending through the centre of gravity of said system, so that the latter is indifferent to, that is to say, uninfluenced by gravity. This axis, which is preferably the north-south axis, is in turn journaled in a second support which is rotatable about a vertical axis that is perpendicular to said north-south axis and to the spin axis of the gyroscope. Said reaction or coercive forces, that is to say, the compressed air or other compressed fluid jets should be so adjusted that no resultant force will be exerted upon the gyroscope when the horizontal axis of oscillation of said gyroscope is in a position at right angles to the direction indicated by the magnet system, i. e., when said axis is north-south.

As a result of the arrangement above described the following combined action takes place. The gyroscope itself offers a very great resistance to any change of direction of its axis of rotation, so that the gyroscope alone exerts a strong quieting action upon the axis of oscillation of the magnet system. If however the compass system deviates for any reason from its correct position, then the force exerted by the compressed air or other fluid jets which are thus rendered operative exerts immediately a correcting action upon the gyroscope, which, by reason of the precessional movements of the gyroscope restores the original relative position between said magnet system and the support for the bearings of said magnet system, which, of course, is the rotor bearing frame 10 of the gyroscope. That is to say, said north-south axis of the gyroscope follows continually the movements of the magnet needle. On account of the resistance which the gyroscope opposes to any change of direction, the tipping force must have sufficient strength in order to cause said gyroscope to precess. A simple displacement of the magnet system occasioned by a brief accidental disturbing influence will not suffice for this purpose, because the magnet system would immediately in such case return to its original position or swing beyond it, which would result in a contrary action. A brief pendulating of the magnet system about the zero position would therefore be without any effect whatever. As a consequence the gyroscope would not begin to precess, except in the case of a swinging movement of the magnet system in one direction occasioned by an actual change of direction, so that said swinging movement to one side continues for a certain length of time. The north-south axis must therefore reproduce the actual mean movements of the magnet system, that is to say, the mean position thereof freed from all disturbing influences. The north-south axis therefore produces a well controlled or quiet indication of the magnetic meridian. A yoke or vertical ring rotatable about the perpendicular axis and having said north-south axis journaled in bearings therein, would, if provided with a compass card enable a controlled quiet indication of the magnet meridian, freed from all disturbing influences to be obtained. Such an indication of the magnet meridian could readily be transmitted to additional compass cards located at a distance through suitable well-known connections which it is unnecessary to describe here, or it might be reproduced in well-known manner for actuating a steering indicator or an automatic course-controlling mechanism.

In accordance with the invention novel means may be provided to eliminate or correct any errors resulting from friction in the bearings of said perpendicular axis. Said means may be of any suitable kind. In the illustrative embodiment of the invention shown said means comprises a gravity responsive device and renders operative another force, also preferably derived from air-jets or other fluid-jets acting against absolute space and which force tends to turn the support containing the bearings of the north-south axis in the same direction as that of the precessional movements of the gyroscope. From the above description it will be seen that the gyroscope itself may be regarded as a conventional directional or three degrees of freedom gyroscope having a magnetic compass mounted on the rotor bearing casing thereof with its north-south axis normally parallel to the horizontal axis of oscillation of the gyroscope and which coerces the gyroscope to maintain said horizontal axis in the magnetic meridian. Any braking or checking of the precessional movements of said gyroscope about said vertical axis will act as a turning impulse upon said gyroscope, which is directed perpendicularly to said vertical axis and to the axis of rotation of said gyroscope, and to which impulse said gyroscope endeavors to respond by a precessional movement about said north-south horizontal axis, causing the tilt of the gyroscope. In view of the friction in its vertical bearings, a turning impulse exerted upon the gyroscope about said north-south axis would not be wholly converted into precessional movements, so that said gravity responsive or vertical direction indicating means connected with the support for the horizontal bearings of said gyroscope would relatively tilt or swing one way or the other. This swinging movement or tilt can be used in accordance with the present invention to render operative said additional force which tends to turn the carrier or support in which the vertical bearings of the north-south axis are mounted about said vertical axis in the same direction as the precessional movements of the gyroscope, thereby eliminating said disturbing influence. As however, said gyroscope opposes to the movements about said perpendicular axis thus caused by said additional force, the resistance of the inherent inertia of said gyroscope, oscillations of brief duration of said gravity responsive means which occur now in one and now in the other direction are of no consequence or effect. Only the totality of such deviations, that is to say, those extending over a considerable time are of any effect or importance, as is the case in the effects produced by the true earth gravity field.

In my invention not only does the gyroscope act as a means for averaging out the temporary oscillations of the magnetic compass, but it also helps to prevent such temporary oscillations by stabilizing the magnetic compass about the north-south axis. This result is secured by mounting the spindle 12 of the magnetic compass and upper and lower pivots within the frame 12a on the rotor bearing frame 10, which is stabilized by the gyro rotor about north-south axis 4—4. Therefore, the vertical axis of the magnetic compass is not tilted out of the vertical plane of the magnetic meridian during turns of the aeroplane or due to other causes but is stabilized in this plane by the gyroscope. By this means, many of the so-called turning errors of the magnetic compass are eliminated or greatly reduced because the vertical axis of the needle is maintained in this vertical plane without the necessity for making it heavy on the south side of the universal pivot as is usually done to keep it horizontal.

Referring now to the drawing, in the purely illustrative embodiment of the invention therein diagrammatically illustrated, a yoke or vertical ring 5, which is rotatable about a vertical axis 6 is provided with sockets for the pivot pins 4 carried by a support or rotor bearing frame 10 in which the gyroscopic rotor 1 is journaled in suitable bearings on spin axis 9, which normally lies east-west. The north-south axis of the system extends through said pivot pins 4, about which said support 10 can thus swing. Said support 10 is also provided with the bearings for the spindle 12 of a magnet system represented herein by magnetic needle 2. The gravity responsive means, herein typified by a divided or two-legged pendulum 8, is also suspended for pendulous movement from a bracket 8a carried by said support 10. The spindle 12 carries a segmental valve member 3 which controls two opposed exit ports 21, 23 for compressed air or other fluid. When the magnetic axis of the magnet system 2 is in a position parallel to said north-south axis 4—4, and therefore perpendicular to the axis of rotation 9 of the gyroscope, said exit ports 21, 23 will be equally closed by said valve member 3, but as soon as the axis of said magnet system deviates from its position parallel to said north-south axis 4, the one or the other of said exit ports will become uncovered, according to the side toward which said magnet system deviates. Said compressed air or other compressed fluid may be introduced from any suitable source of supply (not shown) into the casing 12a surrounding said spindle 12 and in which are provided the ports 21, 23. It will be apparent that the compressed air escaping from either the port 21 or the port 23 in the form of a jet will exert a reaction force upon said support 10. This reaction tends to throw the axis of rotation or spin axis 9 of the gyroscope out of position and thus produces precessional movements of said gyroscope. Similarly the gravity responsive means 8, when in its position of rest, equally closes two opposed openings from a chamber 8c to which compressed air may be supplied in any suitable manner and from any suitable source (not shown), said openings being in a plane perpendicular to the plane of said yoke 5. The one or the other of said two openings will be uncovered by one leg of the divided pendulum 8 according as the latter swings in the one or the other direction, and it will be apparent that the jet of air escaping from either one of said openings will exert upon said yoke a force tending to turn the latter in the one or the other direction, as the case may be, about the vertical axis 6. The mass of the support 10, the gyroscope 1, the magnet system 2, the pendulum 8 and the valve member 3 and other port controlling means will be so distributed that the entire system shall be in a position of indifferent equilibrium as regards the north-south horizontal axis 4—4 and in respect to the gravity field of the earth.

The north-south axis 4—4 must adjust itself in the direction of the magnetic meridian, because just as soon as it deviates from said direction the axis of the magnet system 2 will no longer be parallel to said north-south axis and consequently one or the other of said air discharge ports 21, 23 will be opened more than the other, as above described and a force will thus be exerted upon said bearing support 10. As this force tends to tilt the axis of rotation 9 of the gyroscope out of position, said gyroscope immediately begins to precess in azimuth, and if the direction of rotation of the gyroscope rotor be correctly chosen, a turning movement of the yoke 5 about the vertical axis 6 will be produced. This turning movement turns the support 10 and consequently the escape ports 21, 23, thus tending to close the latter. The resistance offered by the friction in the bearings or by other causes to the precessional movement of the gyroscope produces an actual tipping or tilt of the support 10 about the north-south axis 4. This causes the pendulum 8 to swing from its position which releases, as above described, a jet of compressed air from one of the openings controlled by said pendulum, which tends to turn the yoke 5, as therefore the north-south axis, in the same direction as that in which the precessional force operates, thus eliminating the tilt and tending to turn the north-south axis back toward its original position. The construction and arrangement of the whole system is such that said system will come to rest in a position such that the north-south axis coincides with the magnetic meridian and the axis 9 of rotation of the gyroscope is horizontal. So long as said north-south axis has not reached a position wherein it coincides with the magnetic meridian, said compressed air jet controlled by said magnet system will continue to operate; and so long as the axis of rotation 9 of the gyroscope has not reached a horizontal position, said pendulum 8, or more properly, the air jet force, controlled thereby, will continue to act about said perpendicular axis 6 to eliminate said tilt. It is impossible that the system should come to rest in a position in which the north-south axis coincides with the magnetic meridian, without the axis of rotation 9 of the gyroscope being horizontal, for the reason that in such case the jet of air controlled by the pendulum 8 would continue to tend to turn the system about the perpendicular axis 6, whereupon said magnet system would apparently swing out in the opposite direction, and this would result in an oppositely directed torque about said north-south axis, whereby adjustment of the axis of rotation 9 of the gyroscope perpendicularly to the direction of the gravity field would naturally follow.

As all brief oscillations of the magnet system and of the pendulum 8 are without effect owing to the great inertia of the gyroscope, it will be apparent that said north-south axis 4 does, as a matter of fact, indicate the direction of the magnet meridian in a quite invariable manner, that is to say, continuously without any material deviation therefrom. It might happen that the north-south axis should tip about an axis perpendicular thereto, but in such case the axis of the magnet-system will remain in the plane of the magnet meridian, so that the vertical component of the magnetic earth field cannot cause said magnet system to deviate. Furthermore in the case of such a tipping movement of the entire system, such movement would take place about an axis that is parallel to the axis of rotation of the gyroscope, so that such tipping movement would be without effect upon the gyroscope.

A compass card could be affixed in suitable manner to the yoke 5 and would always indicate without perceptible deviation the true magnetic north direction. The apparatus could also be used for reproducing compass indications at a distance, or for indicating direction. For this purpose an eccentric disk 7 could, for example be mounted upon said vertical axis 6 for controlling two compressed air jets directed from the nozzles 28, 29 toward the opposed nozzles 28a and 29a, respectively, or any other such controlling means could be used for creating a force as soon as the direction of the north-south axis deviates from a determined direction of the bearing support 30 for said vertical axis. The force thus thrown into operation may be used for actuating a steering indicator which would indicate to the pilot in which direction he must steer his air craft in order to get onto the true course. Or the force thus created could also be used for actuating an automatic steering mechanism. Instead of two sets of jets, a greater number could be controlled by said disk 7 thus to control or actuate a greater number of compass cards or other devices at a distance. It will be apparent that electrical or other transmission means could be used to transmit the movements of the north-south axis 4—4 to other compass cards.

It will be apparent to those skilled in the art that any suitable conventional means may be used to rotate the rotor of the gyroscope. Such means are so well known that it is not deemed necessary more fully to describe them.

I am aware that my present invention may be embodied in other specific forms than that herein described without departing from the spirit or essential attributes thereof, and I therefore desire the present embodiment of said invention to be considered in all respects as illustrative and not restrictive, reference being had to the appended claims rather than to the foregoing description to indicate the scope of the invention.

I claim:

1. Apparatus of the class described comprising, in combination, a support rotatable about two axes, the one substantially vertical, the other substantially horizontal, the latter to coincide with the magnetic meridian; rotary magnetically sensitive direction-responsive means and a gyroscope carried by said support, the axis of rotation of said magnetically sensitive direction responsive means being substantially vertical and the axis of rotation of the gyroscope rotor being substantially horizontal and at right angles to said first-named horizontal axis; means to apply a force to the rotor of said gyroscope tending to tip the same in one direction or the other and cause said gyroscope to precess in a corresponding azimuthal direction; and means carried by said support and controlled by rotation of said magnetically sensitive means relatively to said support on deviation of said first-named horizontal axis from the magnetic meridian to render said force applying means operative.

2. Apparatus of the class described comprising, in combination, a support rotatable about two axes, the one substantially vertical, the other substantially horizontal, the latter to coincide with the magnetic meridian; rotary magnetically sensitive direction responsive means and a gyroscope carried by said support, the axis of rotation of said magnetically sensitive direction responsive means being substantially vertical and the axis of rotation of the gyroscope rotor being substantially horizontal and at right angles to said first-named horizontal axis; means to apply a force to the gyroscope rotor tending to tip the same in one direction or the other and cause said gyroscope to precess in a corresponding azimuthal direction; means carried by said support and controlled by rotation of said magnetically sensitive means relatively to said support on deviation of said first-named horizontal axis from the magnetic meridian to render said force applying means operative; means to apply a force adapted to turn said support about said first-named vertical axis; and means controlled by a tipping movement of said gyroscope rotor axis to render said last-named force operative.

3. Apparatus of the class described comprising, in combination, a support rotatable about two axes, the one vertical, the other horizontal, the latter to coincide with the magnetic meridian; rotary magnetically sensitive direction responsive means and a gyroscope carried by said support, the axis of rotation of said magnetically sensitive direction responsive means being substantially vertical and the axis of rotation of the gyroscope rotor being substantially horizontal and at right angles to said first-named horizontal axis; means to apply a pneumatic force to the rotor of said gyroscope tending to tip the same in one direction or the other and cause the gyroscope to precess in a corresponding azimuthal direction; and means carried by said support and controlled by rotation of said direction responsive means relatively to said support on deviation of said first-named horizontal axis from the magnetic meridian to render said pneumatic force applying means operative.

4. Apparatus of the class described comprising, in combination, a support rotatable about two axes, the one vertical and the other horizontal, the latter to coincide with the magnetic meridian; rotary magnetically sensitive direction responsive means and a gyroscope carried by said support, the axis of rotation of said magnetically sensitive direction responsive means being substantially vertical and the axis of rotation of the gyroscope rotor being substantially horizontal and at right angles to said first-named horizontal axis; means to apply a pneumatic force to the gyroscope rotor tending to tip the same in one direction or the other and cause said gyroscope to precess in a corresponding azimuthal direction; means carried by said support and controlled by rotation of said magnetically sensitive means relatively to said support on deviation of said first-named horizontal axis from the magnetic meridian to render said pneumatic force applying means operative; means to apply a pneumatic force adapted to turn said support about said first-named vertical axis; and means controlled by the tipping movement of said gyroscope rotor axis to render said last-named pneumatic force applying means operative.

5. Apparatus of the class described comprising, in combination, a support rotatable about two axes, the one vertical and the other horizontal, the latter to coincide with the magnetic meridian; rotary magnetically sensitive direction responsive means and a gyroscope carried by said support, the axis of rotation of said indicating means being substantially vertical and the axis of rotation of the gyroscope rotor being substantially horizontal and at right angles to said first-named horizontal axis; means supplied with pressure fluid and provided with an outlet port therefor, said outlet port being arranged to exert fluid reaction torques about said horizontal axis; and means carried by said support and controlled by rotation of said magnetically sensitive means relatively to said support on deviation of said first-named horizontal axis from the magnetic meridian to open said port and allow pressure fluid to escape therefrom to impart a movement to said gyroscope rotor tending to tip the same and cause said gyroscope to precess in an azimuthal direction.

6. Apparatus of the class described comprising, in combination, a support rotatable about two axes, the one substantially vertical and the other substantially horizontal, the latter to coincide with the magnetic meridian; rotary magnetically sensitive direction responsive means and a gyroscope carried by said support, the axis of rotation of said direction responsive means being substantially vertical and the axis of rotation of the gyroscope rotor being substantially horizontal and at right angles to said first-named horizontal axis; means supplied with pressure fluid and provided with an outlet port therefor, said outlet port being arranged to exert fluid reaction torques about said horizontal axis; means carried by said support and controlled by rotation of said direction responsive means relatively to said support on deviation of said first-named horizontal axis from the magnetic meridian, to open said port and allow pressure fluid to escape therefrom to impart a movement to said rotor tending to tip the same and cause said gyroscope to precess in an azimuthal direction; further means carried by said support and supplied with pressure fluid and provided with an outlet port therefor, said last named outlet port being arranged to exert fluid reaction torques about said vertical axis; and means controlled by the tipping movement of said support to open said port and allow pressure fluid to escape therefrom and cause the gyroscope to precess about said horizontal axis.

7. Apparatus of the class described comprising a support rotatable about two axes, the one substantially vertical and the other substantially horizontal, the latter to coincide with the magnetic meridian; a compass carried by said support and comprising a relatively rotatable magnetically sensitive element and casing therefor, the axis about which said element is rotatable relatively to its casing being substantially vertical; a gyroscope carried by said support, the axis of rotation of the rotor of said gyroscope being perpendicular to said first-mentioned axes; means to apply a force to said rotor tending to tip the same and cause the same to precess in an azimuthal direction, said force having one point of application on said gyroscope and the other on the atmosphere; and means controlled by rotation of said element relatively to its casing to render said force applying means operative.

8. Apparatus of the class described comprising a support rotatable about two axes, the one substantially vertical and the other substantially horizontal, the latter to coincide with the magnetic meridian; rotary magnetically sensitive direction responsive means and a gyroscope carried by said support, the axis of rotation of said direction responsive means being substantially vertical and the axis of rotation of the gyroscope rotor being substantially horizontal and at right angles to said first-named horizontal axis; means to apply a force to the axis of rotation of the gyroscope rotor tending to tip the same in one direction or the other and cause said gyroscope to precess in a corresponding azimuthal direction; means carried by said support and controlled by rotation of said direction responsive means relatively to said support on deviation of said first-named horizontal axis from the magnetic meridian to render said force applying means operative; means to applying a torque to said support about said first-named vertical axis; and pendulous means connected to said support and controlled by a tipping movement of said gyroscope spin axis to render said torque applying means operative.

9. A gyro-magnetic compass comprising a directional gyroscope having a normally horizontal east-west directed spin axis, a gyroscope support, a magnetic element mounted thereon whereby said element becomes stabilized in a north-south vertical plane, and means controlled by a relative displacement of said support and said magnetic element for maintaining the gyroscope spin axis in predetermined azimuth relation to the average position of the magnetic element.

10. A gyro-magnetic compass comprising a support rotatable about a substantially vertical and a substantially horizontal axis, a gyro rotor with a horizontal spin axis carried by said support, a magnetic element mounted on said support for free turning about a substantially vertical axis, means to stabilize said magnetic element against tilting out of a north-south vertical plane, and a source of power rendered effective upon relative displacement of said element and said support from a predetermined relative position to cause said gyroscope to precess to move said support into the predetermined relative position.

11. In a gyro-magnetic compass, the combination, with a directional gyroscope having a gyro rotor support, of a magnetic element rotatably mounted thereon, laterally and oppositely directed air ports in said support, shutters adapted to be operated by said element for oppositely closing and opening said ports upon relative turning of said element and support in azimuth, and means for maintaining differential air pressure within and without said support to cause a flow of air through said ports.

12. In a gyro-magnetic compass the combination with a directional gyroscope having a gyro rotor support, of a magnetic element pivotally mounted thereon, and a source of power rendered effective upon relative displacement of said element and gyroscope to cause said gyroscope to follow the average position of said element.

13. A gyro-magnetic compass comprising a gyro rotor, a rotor bearing support in which said rotor is journaled on a horizontal spin axis, a vertical ring in which said support is journaled about a second horizontal axis normal to said spin axis, a magnetic needle pivoted on said support for movement about a normally vertical axis, and means responsive to relative turning of said needle and support in azimuth for applying a torque on said gyroscope about said second horizontal axis to precess said gyroscope into agreement with said needle.

14. A gyro-magnetic compass comprising a gyro rotor, a rotor bearing support in which said rotor is journaled on a horizontal spin axis, an outer ring in which said support is journaled about a second axis at right angles to said other axis, an outer frame in which said ring is journaled about a third perpendicular axis, a magnetic needle pivoted on said support about a normally vertical axis, means responsive to relative turning of said needle and support in azimuth for applying a torque on said gyroscope about said second axis to precess said gyroscope into agreement with said needle, and means responsive to tilt of said support for applying a corrective torque about the vertical axis.

15. A gyro-magnetic compass comprising a gyroscope operating normally on a horizontal spin axis, a gyro rotor support, a magnetic element mounted thereon, and means controlled by said magnetic element for maintaining the gyroscope spin axis in fixed azimuth relation to the average position of the magnetic element.

16. A gyro-magnetic compass comprising a gyro rotor, a gyroscope support in which said rotor is mounted on a normally horizontal spin axis, pendulum controlled power means for maintaining the gyroscope spin axis in a horizontal position, a pivoted magnetic element mounted on said support, and power means actuated from relative turning of said magnetic element and support for maintaining the gyroscope spin axis on the magnetic east-west direction.

GUIDO WÜNSCH.